United States Patent Office 3,560,044
Patented Feb. 2, 1971

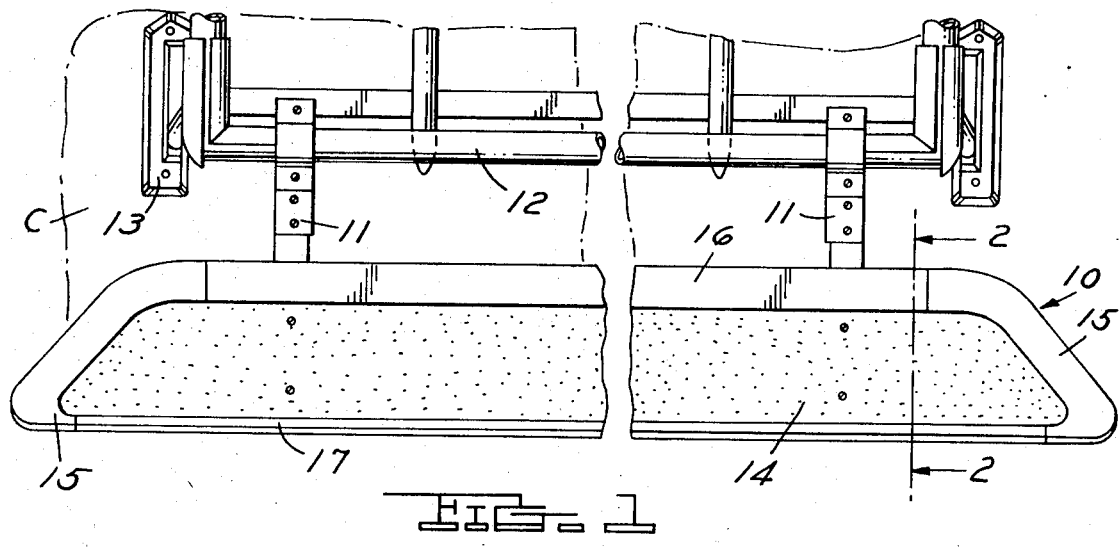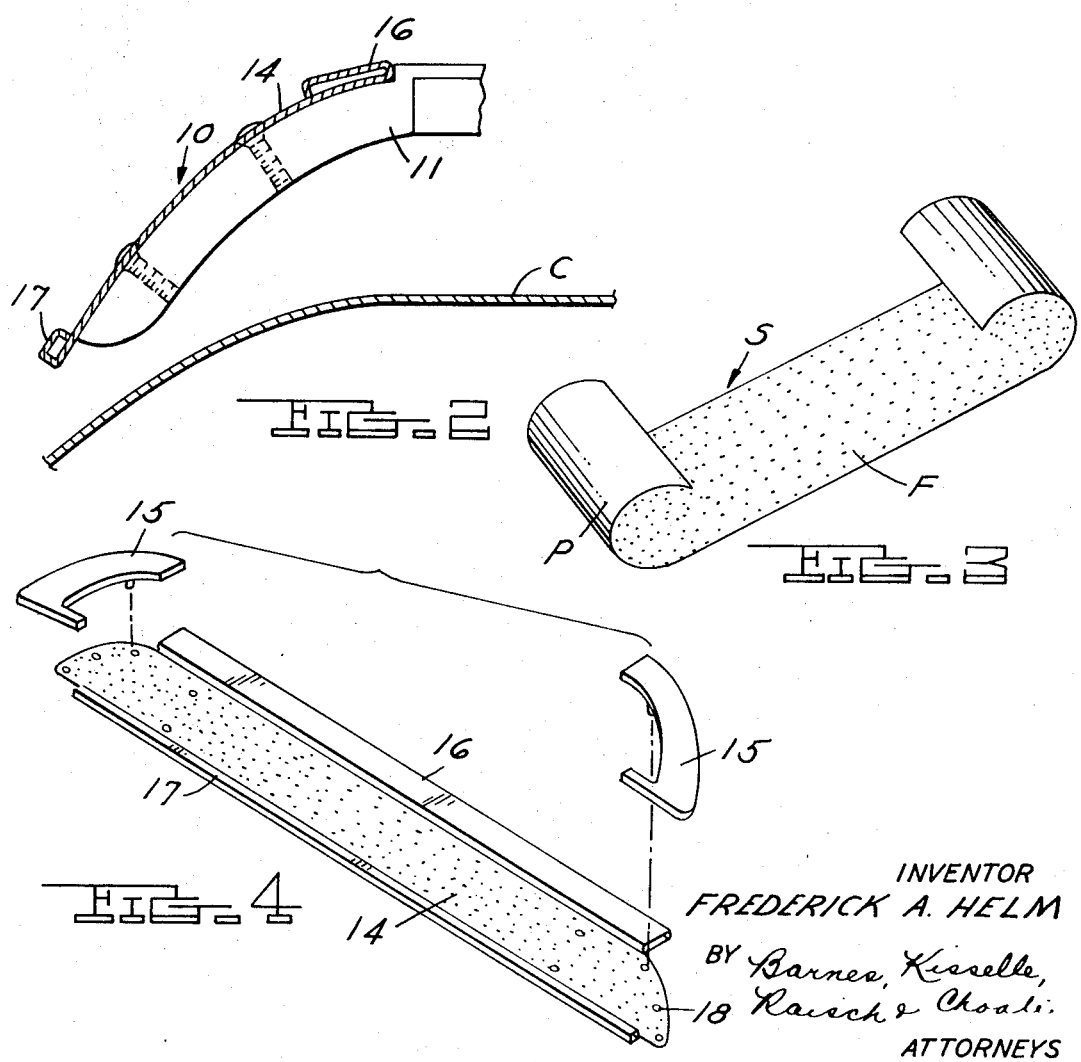

3,560,044
AUTOMOBILE WIND DEFLECTOR
Frederick A. Helm, Detroit, Mich., assignor to Helm Design & Manufacturing, Inc., Detroit, Mich., a corporation of Michigan
Filed Apr. 30, 1969, Ser. No. 820,579
Int. Cl. B60j 1/20
U.S. Cl. 296—91                                    10 Claims

ABSTRACT OF THE DISCLOSURE

A wind deflector mounted adjacent the rear window of an automobile and comprising a longitudinally extending member with upper and lower edges which is made of a sheet of stainless material. The outer surface of the sheet has a satin finish and the inner surface of the sheet is polished. The upper and lower edges are bent inwardly over the satin finish to provide longitudinally extending ribs that have their exterior surfaces polished.

This invention relates to wind deflectors for automobiles.

BACKGROUND OF THE INVENTION

It is common in connection with automobiles of the station wagon type to utilize wind deflectors adjacent the rear window in an effort to prevent the accumulation of dirt and other foreign matter on the rear window. Such wind deflectors conventionally may comprise a longitudinally extending member that is mounted above the upper edge of the rear window. Such members for decorative purposes often have removable moldings along the upper and lower edges thereof. In the manufacture of such wind deflectors obviously the use of a plurality of parts involves substantial labor and cost.

Among the objects of the present invention are to provide a wind deflector which is pleasing in appearance, low in cost and relatively easily made.

DESCRIPTION OF THE DRAWINGS

FIG. 1 is a fragmentary plan view of an automobile embodying the invention.

FIG. 2 is a fragmentary sectional view taken along the line 2—2 in FIG. 1.

FIG. 3 is a fragmentary view showing the manner in which the deflector is made.

FIG. 4 is an exploded perspective view of the wind deflector embodying the invention.

DESCRIPTION

Referring to FIGS. 1 and 2, wind deflector 10 embodying the invention is adapted to be supported by brackets 11 on the cross rail 12 of a luggage rack which is supported on the car top C by stanchions 13.

As shown in FIGS. 1 and 2, the deflector 10 comprises a longitudinally extending member 14 that is made of a stainless sheet material which is uniformly thick and removable die cast end members 15. The member 14 has an outer convex surface and an inner concave surface in vertical section.

The longitudinally extending member 14 is made from a sheet S that has an outer rolled satin finish surface F and an opposite inner polished surface P. The member 14 is formed by bending the upper and lower longitudinal edges inwardly over the satin finish surface F to form upper and lower longitudinally extending beads or ribs 16, 17. The beads or ribs 16, 17 thus expose polished surfaces and the wind deflector thus achieves an overall appearance as if it were made with separately molded and clipped on ribs along its longitudinal edges.

As shown in FIG. 4, the end members 15 are then placed into position to close the ends of the ribs 16, 17 by fastening with screws that extend through openings 18 into the end members 15.

It can thus be seen that there has been provided a wind deflector which is made of a relatively fewer number of parts, is attractive in appearance, and gives the appearance of having been made of several parts. The deflector can be made easily and at relatively low cost.

I claim:
1. The combination comprising:
    a longitudinally extending member of stainless steel sheet material having vertically spaced longitudinally extending upper and lower edges,
    the outer surface of said member having a satin finish,
    the inner opposite surface of said member having a polished finish,
    at least one of said longitudinal edges being bent inwardly over the outer surface to provide a raised longtudinally extending rib with an exposed polished surface adjacent the exposed satin finish surface of the outer surface of said member,
    and means for supporting said longitudinally extending member on an automobile adjacent the rear window thereof.

2. The combination set forth in claim 1 wherein both of said longitudinally extending edges are bent inwardly over the outer surface to form raised ribs along the top and bottom edges of the longitudinally extending member with each rib having an exterior surface which is polished and adjacent the exposed satin finish surface.

3. The combination set forth in claim 1 wherein said longitudinally extending member is made of substantially uniformly thick sheet material.

4. The combination set forth in claim 1 wherein the exterior surface of said longitudinally extending member is convex in vertical section.

5. The combination set forth in claim 1 wherein said satin finish is provided by rolling said surface.

6. A deflector for use on an automobile adjacent a window comprising:
    a longitudinally extending member of stainless steel sheet material having vertically spaced longitudinally extending upper and lower edges,
    the outer surface of said member having a satin finish,
    the inner opposite surface of said member having a polished finish,
    at least one of said longitudinal edges being bent inwardly over the outer surface to provide a raised longitudinally extending rib with an exposed polished surface adjacent the exposed satin finish surface of the outer surface of said member.

7. The combination set forth in claim 6 wherein both of said longitudinally extending edges are bent inwardly over the outer surface to form raised ribs along the top and bottom edges of the longitudinally extending member with each rib having an exterior surface which is polished and adjacent the exposed satin finish surface.

8. The combination set forth in claim 6 wherein said longitudinally extending member is made of substantially uniformly thick sheet material.

9. The combination set forth in claim 6 wherein the exterior surface of said longitudinally extending member is convex in vertical section.

10. The combination set forth in claim 6 wherein said satin finish is provided by rolling said surface.

References Cited

UNITED STATES PATENTS

| | | | |
|---|---|---|---|
| 3,059,562 | 10/1962 | Sturtevant et al. | 296—91X |
| 3,097,882 | 7/1963 | Andrews | 296—91 |
| 3,427,067 | 2/1969 | Kish | 296—1 |

LEO FRIAGLIA, Primary Examiner

L. J. PAPERNER, Assistant Examiner

U.S. Cl. X.R.

296—1